United States Patent Office 3,476,692
Patented Nov. 4, 1969

3,476,692
SILICOMAGNESIUM-ALUMINATE-HYDRATE GEL
AND METHOD OF PREPARING THE SAME
Klaus Hoffmann, Dresden, Germany, assignor to VEB
Arzneimittelwerk, Dresden, Germany
No Drawing. Filed Feb. 4, 1966, Ser. No. 525,144
Int. Cl. B01j 13/00; A61k 27/06; C01b 33/20
U.S. Cl. 252—317    10 Claims

ABSTRACT OF THE DISCLOSURE

Silicomagnesium-aluminate-hydrate gel prepared by the reaction between an alkali hydroxide solution containing water glass and an aqueous solution of an aluminum salt to form a suspension of alkali metal-aluminum-silicate-hydrate gel in alkali metal-hydroxy-aluminate solution and reaction thereof with an aqueous solution of a magnesium salt, in which the mol ratio of $Al_2O_3:M_2O$ in the first reaction step, wherein M is a physiologically compatible alkali metal, is between about 1:8 and 1:20.

---

The present invention relates to a silicomagnesium-aluminate-hydrate gel and to the production of such gel and the use thereof in the treatment of hyperacidity.

In the therapy of hyperacidity of the stomach and of the duodenum along with their associated conditions, so-called antacids are being used which comprise a series of therapeutic agents of mainly inorganic basis which are used to achieve relief by different action mechanisms.

One way to curb hyperacidity is by adsorption. For this purpose substances are used which, because of their extensive inner surface area, provide a high degree of adsorption, but which only possess a very slight acid-binding capacity. Such substances include calcium silicate gels and sodium-aluminum-silicate.

Another group of antacids possess a very high degree of acid-binding capacity, but only a slight or no adsorptive capacity, such as $NaHCO_3$, $MgCO_3$, $MgO$, and $CaCO_3$. These agents have the considerable disadvantage of neutralizing the gastric juices or even alkalinizing the same, that is adjusting the same to an unphysiologically high pH value. By reason of this displacement of the pH value of the gastric juices into an unphysiological range, a still higher hydrochloric acid production occurs in the stomach, which finally aggravates the condition, resulting in the so-called "acid rebound."

In recent times, preparations have been developed which besides exhibiting a high degree of adsorption capacity also exhibit a relatively high acid-binding capacity, without displacing the pH value of the gastric juices into alkaline range. Among this group of preparations are magnesium trisilicate and simple magnesium-aluminum-silicate. The disadvantage of these compounds resides in the fact that despite a generally good acid-binding capacity, the physiological optimum pH range of 3–5 is not maintained, but a buffering of the gastric juices occurs which may extend up to the vicinity of the neutral point.

Modern antacids are supposed to meet a number of requirements; they are supposed to maintain the pH range between about 3 and 5, at most up to 5.5; to act promptly and to last for a long time; to exhibit an acid-binding capacity of 150–270 ml. n/10 HCl per gram, to possess a high adsorption capacity and accordingly also good antipeptic properties, and in addition not to exhibit any undesired laxative or constipating action. Among the compounds which are useful in several respects are magnesium-aluminum-hydrate, dihydroxy aluminum-sodium carbonate, and aluminum hydroxide gels, the latter with reservations because of their aging properties. The pure aluminum compounds of this group exhibit a constipating side effect, while the pure magnesium compounds exhibit a strong laxative effect so that compounds have been used in practice which contain magnesium as well as aluminum in order to compensate these side effects or to maintain the same wihin proper limits.

It is accordingly a primary object of the present invention to provide a new antacid on the basis of a combination of magnesium and aluminum, with improved properties as compared to known antacids.

It is another object of the present invention to provide a new group of antacids having improved antacid action with a minimum of undesired side effects.

It is yet another of the present invention to provide silicomagnesium-aluminate-hydrate antacids which act rapidly, for a relatively long period of time, and which do not displace the pH range into undesired neutral region.

It is still a further object of the present invention to provide a method of producing the new silicomagnesium-aluminate-hydrate antacids of this invention.

As another object the present invention comprises the use of the silicomagnesium-aluminate-hydrate gels of this invention to relieve hyperacidity.

Other objects and advantages of the present invention will be apparent from a further reading of the specification and of the appended claims.

With the above and other objects in view, the present invention mainly comprises a silicomagnesium-aluminate-hydrate gel.

The silicomagnesium-aluminate-hydrate gels are prepared by the reaction between a strong alkali hydroxide solution containing water glass and an aqueous solution of an aluminum salt to form a suspension of alkali metal-aluminum-silicate-hydrate gel, in alkali metal hydroxide aluminate solution. This is subsequently stirred with an aqueous magnesium salt solution, in which the mol ratio of $Al_2O_3:M_gO$ is 1:3 to 1:4. The precipitate formed is filtered off, washed with water until free of alkali metal hydroxide and salt, and then dried at 65° C. to 90° C.

In this method of producing the silicomagnesium-aluminate-hydrate gels according to the invention it is very important to maintain the alkalinity of the suspension of the gel in the alkali metal hydroxide aluminate solution at a certain value. The mol ratio of $Al_2O_3:M_2O$, wherein M is a physiologically compatible alkali metal, is between about 1:8 and 1:20 preferably 1:10 to 1:15. This is quite surprising since such an alkalinity was not used heretofore in the production of magnesium-aluminum-silicates and even of magnesium-aluminates, because it was thought that under those conditions upon the subsequent reaction with magnesium salts the undesired magnesium hydroxides would be formed which would result in the production of antacids that would displace the pH value in an undesirable manner so far above 7.

In carrying out the method of the invention it is preferred that the physiologically compatible alkali metal hydroxide be sodium and that the aluminum salt be aluminate sulfate.

In Table 1 below there is given a summary of the amounts of alkali used in the production of modern antacids based on magnesium-aluminum, as compared to the present invention.

TABLE 1

| Substance: | Alkalinity of the aluminate liquor mol ratio of $Al_2O_3:Na_2O$ |
|---|---|
| German Patent No. 963,182 | 1:3 to 1:5 |
| German Patent No. 1,061,754 | 1:2 to 1:3 |
| The present invention | 1:8 to 1:20, preferably 1:10 to 1:15 |

Table 2 below exhibits the advantages of the antacid produced according to the example of this application as compared to known commercial preparations.

TABLE 2

| Substance | Acid-binding capacity ml. 0.1 n HCl/g. | Start of Action | Duration of action, minutes | Buffering Range, pH |
|---|---|---|---|---|
| Calcium-silicate-gel | 60 | Immediate | 20 | 3–6.5 |
| Sodium-aluminum-silicate | 70 | Action commences only upon overdosing. | | |
| Aluminum hydroxide dry gel | 170 | After 10 minutes | 80 | 3–4 |
| Magnesium-aluminum-silicate of German Patent No. 941,864. | 165 | Immediate | 50 | 3–5.5 |
| Silicomagnesium aluminate hydrate-dry gel of the example of the invention. | 240–260 | do | 90 | 3–4.5 |

The acid-binding capacity was determined according to the method described for aluminum hydroxide gel in the U.S. Pharmacopeia (referred to in "The Dispensatory of U.S.A.," p. 55 ff. (1960)) The start of the action, the duration of the action, and the maintenance of the determined pH range (buffering range) were determined by reference to the methods described by Holbert, Noble, Grote in Journal of American Pharmaceutical Association, 36, 149 (1947) and Beekman, in Journal of the American Pharmaceutical Association, 49, 191 (1960), as follows:

"150 ml. of artificial gastric juice (0.05 in HCl, 0.15% pepsin) was prepared. The pH value of the solution was measured electrometrically at the beginning of the test, then after 0.5, 1, 3, 5, 7, 9 and 10 minutes and then in time intervals of 10 minutes. After the addition of 1.00 g. of the antacid being tested, 20 ml. of suspension was withdrawn every 10 minutes, and its place 20 ml. of the above described freshly prepared artificial gastric juice was added. The determination was carried out at 38° C. The test was discontinued when the pH value of the solution dropped below 3.0."

As compared to the crystalline magnesium-aluminum-hydrate of German Patent No. 963,182, the non-crystalline silico-magnesium-alumniate-hydrate gel of the example of this invention having approximately the same acid binding capacity exhibits a much prompter action (note Table 3). The start of the action was characterized by the time required for 1.00 g. of the tested substance to adjust the pH value of the given acid solution to 3.0

TABLE 3

| Compound | Start of action of the antacid in minutes for the given amount of n/10 HCl | |
|---|---|---|
| | 150 ccm | 200 ccm |
| German Patent No. 963,182 (Fig. 5) | 4 | 8 |
| Example of this invention | 0.5 | 1.5–2.0 |

The product made by this invention differs markedly from known products of similar type, which contain magnesium aluminum and silicon, in the analytical composition of the residue remaining after heating to incandescence (glow residue), as can be seen from Table 4 below.

The products made according to the present invention moreover possess the advantage of a prolonged shelf life, that is they do not age so that even after a long time of storage at room temperature they maintain full activity.

The following example is given to illustrate the method of producing the products of the invention. However, the scope of the invention is not meant to be limited to the specific details of the example.

EXAMPLE 197.5 kg. of 32.5% aqueous sodium hydroxide, 90 liters of water and 19.0 kg. of a commercial sodium water glass solution are mixed and then during a time period of 30 minutes under stirring added to a filtered solution of 36.0 kg. of technical, crystalline aluminum sulfate (17–18% $Al_2O_3$) in 150 liters of water. After the end of the addition the mixture is stirred further for 30 minutes; then a filtered solution of 51.0 kg. of crystalline, technical magnesium sulfate in 150 liters of water is added while stirring in a fine stream during a course of about 3 hours. The reaction mixture is further stirred for an additional 1.5 hours and then allowed to stand overnight.

The obtained suspension is filtered and washed with water until alkali-free and salt-free. The filter residue is dried at 75–80° C. for 24 hours in a circulating air drying chamber and then milled. The yield is 22 kg.

The administration of the above product orally, in the form of tablets, has the effect of rapid and prolonged relief of hyperacidity. Usually one or two tablets containing from 0.3 to 0.5 g. of the above antacid per tablet are administered between the meals or whenever needed.

While the invention has been described in particular with respect to the production of a specific silicomagnesium-aluminate-hydrate gel, it is to be understood that variations and modifications of the invention can be made without departing from the spirit or scope of the invention. Such variations and modifications are accordingly meant to be comprehended within the meaning and scope of equivalence of the appended claims.

What is claimed is:

1. Silicomagnesium-aluminate-hydrate gel prepared by the reaction between an alkali hydroxide solution containing water glass and an aqueous solution of an aluminum salt to form a suspension of alkali metal-aluminum-silicate-hydrate gel in alkali metal-hydroxy-aluminate solution and reaction thereof with an aqueous solution of

TABLE 4

| Substance | Analytical Composition of the Glow Residue | | | |
|---|---|---|---|---|
| | $Al_2O_3$, percent | MgO, percent | $SiO_2$, percent | Glow Loss, percent $H_2O$ |
| Magnesium-aluminum silicate of German Patent No. 941,864 | 16.3 | 25.8 | 57.7 | About 30 |
| Magnesium alumino-silicate of German Patent No. 1,061,754 | 33.0 | 12.7 | 39.0 | 12.9 |
| Silico-magnesium-aluminum-hydrate gel of this invention | 23.4 | 46.0 | 17.5 | 37.0 | a magnesium salt, in which the mol ratio of $Al_2O_3:M_2O$ in the first reaction step, wherein M is a physiologically compatible alkali metal, is between about 1:8 and 1:20.

2. Silicomagnesium-aluminate-hydrate gel according to claim 1, in which the magnesium salt is magnesium sulfate.

3. Silicomagnesium-aluminate-hydrate gel according to claim 1, wherein the mol ratio of $Al_2O_3:M_2O$ is between about 1:10 and 1:15.

4. Method of producing a silicomagnesium-aluminate-hydrate gel, which comprises reacting a solution of a physiologically compatible alkali metal hydroxide containing water glass with an aqueous solution of an aluminum salt in which the mol ratio of $Al_2O_3:M_2O$, wherein M is a physiologically compatible alkali metal, is between about 1:8 and 1:20 and the mol ratio of $Al_2O_3:SiO_2$ is between about 1:1.2 and 1:1.6 so as to form a suspension of alkali metal-aluminum-silicate-hydrate gel in alkali metal hydroxy-aluminate solution; and reacting the same with an aqueous solution of a magnesium salt while maintaining a mol ratio of $Al_2O_3:MgO$ at between about 1:3 and 1:4, thereby forming the silicomagnesium-aluminate-hydrate gel.

5. Method according to claim 4 wherein the alkali metal is sodium and wherein the aluminum salt is aluminate sulfate.

6. Method according to claim 5 wherein the mol ratio of $Al_2O_3:Na_2O$ is between about 1:10 and 1:15.

7. Method according to claim 4 wherein the silicomagnesium-aluminate-hydrate gel which is formed as a precipitate is filtered, washed with water until alkali-free and salt-free, and dried.

8. Method according to claim 7 wherein the drying is carried out at a temperature of about 65–95° C.

9. Method according to claim 8 wherein the alkali metal is sodium, wherein the aluminum salt is aluminum sulfate, and wherein the mol ratio of $Al_2O_3:Na_2O$ is between about 1:10 and 1:15.

10. Method according to claim 4, in which the magnesium salt is magnesium sulfate.

References Cited

UNITED STATES PATENTS 2,990,247   6/1961   Conard et al. _____ 424—155 X

RICHARD D. LOVERING, Primary Examiner

U.S. Cl. X.R.

242—453; 424—155